US012639292B1

(12) United States Patent
Aggarwal et al.

(10) Patent No.: US 12,639,292 B1
(45) Date of Patent: May 26, 2026

(54) CASCADE AI MODEL-BASED DATA FILTERING BASED ON PROMPT

(71) Applicant: Snowflake Inc., Bozeman, MT (US)

(72) Inventors: Paritosh Aggarwal, San Carlos, CA (US); Bowei Chen, San Bruno, CA (US); Boxin Jiang, Sunnyvale, CA (US); Pawel Marcin Liskowski, Poznan (PL); Kyle Duncan Schmaus, San Francisco, CA (US); Dimitrios Tsirogiannis, Belmont, CA (US); Nathan Wiegand, Austin, TX (US); Weicheng Zhao, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/282,302

(22) Filed: Jul. 28, 2025

(51) Int. Cl.
 *G06F 16/242* (2019.01)
 *G06F 16/22* (2019.01)
 *G06F 16/2453* (2019.01)
 *G06F 16/2455* (2019.01)

(52) U.S. Cl.
 CPC ...... *G06F 16/2425* (2019.01); *G06F 16/2282* (2019.01); *G06F 16/24532* (2019.01); *G06F 16/24554* (2019.01)

(58) Field of Classification Search
 CPC ............. G06F 16/2425; G06F 16/2282; G06F 16/24532; G06F 16/24554
 USPC ........................................................ 707/775
 See application file for complete search history.

(56) References Cited

U.S. PATENT DOCUMENTS

| | | | | |
|---|---|---|---|---|
| 12,236,193 | B1 * | 2/2025 | Kuperman | ............ G06F 40/284 |
| 2023/0148321 | A1 * | 5/2023 | Hall | ....................... G16H 50/20 |
| | | | | 706/12 |
| 2024/0160902 | A1 * | 5/2024 | Padgett | ................ G06N 3/0895 |
| 2025/0252032 | A1 * | 8/2025 | Shah | ................... G06F 11/3428 |

OTHER PUBLICATIONS

Chen, Lingjiao, et al., "FrugalGPT: How to Use Large Language Models While Reducing Cost and Improving Performance", arXiv:2305.05176v1, (May 9, 2023), 13 pgs.

Kang, Daniel, et al., "Approximate Selection with Guarantees using Proxies", arXiv:2004.00827v4, (Jan. 3, 2022), 15 pgs.

Patel, Liana, et al., "Semantic Operators: A Declarative Model for Rich, AI-based Data", arXiv:2407.11418v3, (Mar. 1, 2025), 14 pgs.

* cited by examiner

*Primary Examiner* — Michael Pham
(74) *Attorney, Agent, or Firm* — Schwegman Lundberg & Woessner, P.A.

(57) ABSTRACT

Various example embodiments described herein provide for systems, methods, devices, instructions, and the like for using AI model cascades to filter data on a data system, such as a database system, based on an artificial intelligence model prompt (e.g., user-provided prompt). In particular, various example embodiments enable a database system to use cascaded AI models and adaptive bounds to optimize data filtering operations based on an artificial intelligence model prompt (also referred to herein as just a prompt) while balancing computational cost and accuracy, which can be useful in processing large-scale data queries.

30 Claims, 7 Drawing Sheets

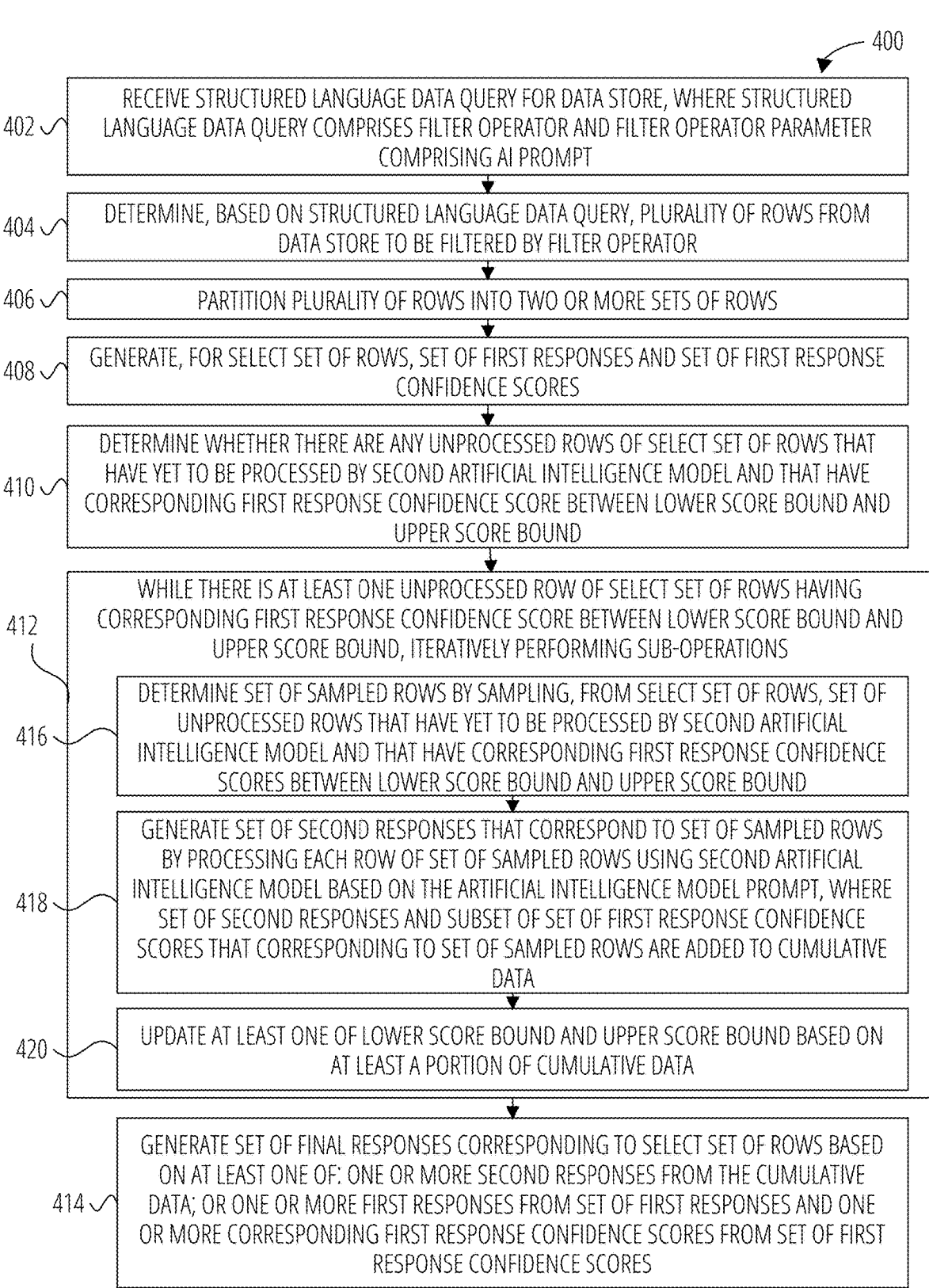

400

402 — RECEIVE STRUCTURED LANGUAGE DATA QUERY FOR DATA STORE, WHERE STRUCTURED LANGUAGE DATA QUERY COMPRISES FILTER OPERATOR AND FILTER OPERATOR PARAMETER COMPRISING AI PROMPT

404 — DETERMINE, BASED ON STRUCTURED LANGUAGE DATA QUERY, PLURALITY OF ROWS FROM DATA STORE TO BE FILTERED BY FILTER OPERATOR

406 — PARTITION PLURALITY OF ROWS INTO TWO OR MORE SETS OF ROWS

408 — GENERATE, FOR SELECT SET OF ROWS, SET OF FIRST RESPONSES AND SET OF FIRST RESPONSE CONFIDENCE SCORES

410 — DETERMINE WHETHER THERE ARE ANY UNPROCESSED ROWS OF SELECT SET OF ROWS THAT HAVE YET TO BE PROCESSED BY SECOND ARTIFICIAL INTELLIGENCE MODEL AND THAT HAVE CORRESPONDING FIRST RESPONSE CONFIDENCE SCORE BETWEEN LOWER SCORE BOUND AND UPPER SCORE BOUND

412 — WHILE THERE IS AT LEAST ONE UNPROCESSED ROW OF SELECT SET OF ROWS HAVING CORRESPONDING FIRST RESPONSE CONFIDENCE SCORE BETWEEN LOWER SCORE BOUND AND UPPER SCORE BOUND, ITERATIVELY PERFORMING SUB-OPERATIONS

416 — DETERMINE SET OF SAMPLED ROWS BY SAMPLING, FROM SELECT SET OF ROWS, SET OF UNPROCESSED ROWS THAT HAVE YET TO BE PROCESSED BY SECOND ARTIFICIAL INTELLIGENCE MODEL AND THAT HAVE CORRESPONDING FIRST RESPONSE CONFIDENCE SCORES BETWEEN LOWER SCORE BOUND AND UPPER SCORE BOUND

418 — GENERATE SET OF SECOND RESPONSES THAT CORRESPOND TO SET OF SAMPLED ROWS BY PROCESSING EACH ROW OF SET OF SAMPLED ROWS USING SECOND ARTIFICIAL INTELLIGENCE MODEL BASED ON THE ARTIFICIAL INTELLIGENCE MODEL PROMPT, WHERE SET OF SECOND RESPONSES AND SUBSET OF SET OF FIRST RESPONSE CONFIDENCE SCORES THAT CORRESPONDING TO SET OF SAMPLED ROWS ARE ADDED TO CUMULATIVE DATA

420 — UPDATE AT LEAST ONE OF LOWER SCORE BOUND AND UPPER SCORE BOUND BASED ON AT LEAST A PORTION OF CUMULATIVE DATA

414 — GENERATE SET OF FINAL RESPONSES CORRESPONDING TO SELECT SET OF ROWS BASED ON AT LEAST ONE OF: ONE OR MORE SECOND RESPONSES FROM THE CUMULATIVE DATA; OR ONE OR MORE FIRST RESPONSES FROM SET OF FIRST RESPONSES AND ONE OR MORE CORRESPONDING FIRST RESPONSE CONFIDENCE SCORES FROM SET OF FIRST RESPONSE CONFIDENCE SCORES

FIG. 4

524 — DETERMINE WHETHER THERE IS SUBSET OF UNPROCESSED ROW(S) WITH PROXY SCORES BETWEEN BOUNDS

526 — SUBSET EXISTS?

YES

NO

PRODUCE CASCADE RESULTS FOR CURRENT SET OF ROWS — 528

602 — DETERMINE WHETHER FIXED PERCENTAGE OF SUBSET OF UNPROCESSED ROW(S) BEEN SAMPLED

604 — FIXED PERCENTAGE SAMPLED?

YES

NO

606 — CALL EXPENSIVE AI MODEL ON ALL OF SUBSET OF UNPROCESSED ROW(S) WITH USER PROMPT

530 — RANDOMLY SAMPLE ROWS FROM SUBSET AND CALL EXPENSIVE AI MODEL ON SAMPLE WITH USER PROMPT

532 — RETAIN AI MODEL RESULT(S) AND CORRESPONDING SCORES

534 — UPDATE BOUNDS BASED PROXY SCORES OF STORED RESULTS

FIG. 6

CASCADE AI MODEL-BASED DATA FILTERING BASED ON PROMPT

TECHNICAL FIELD

Embodiments described herein relate to data systems and, more particularly, to systems, methods, devices, and instructions for using cascade artificial intelligence (AI) models to filter data on a data system, such as a database system, based on a prompt (e.g., user-provided prompt).

BACKGROUND

Databases are widely used for data storage and access in computing applications. A goal of database storage is to provide enormous sums of information in an organized manner so that it can be accessed, managed, updated, and shared. Data may be organized into rows, columns, and tables in a database. Different database storage systems may be used to store different types of content, such as bibliographic, full text, numeric, and image content. Further, in computing, different database systems may be classified according to the organizational approach of the database. There are many different types of databases, including relational, distributed, cloud, object-oriented, and others.

Databases may include one or more tables that include or reference data that can be joined, read, modified, or deleted using queries. Databases can store small or large sets of data within one or more tables. This data can be accessed by various users in an organization or even be used to service public users, such as via a website or an application programming interface (API). Both computing and storage resources and their underlying architecture can play a significant role in achieving desirable database performance, including facilitating access to different types of data.

BRIEF DESCRIPTION THE DRAWINGS

Various ones of the appended drawings merely illustrate various example embodiments of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

FIG. 4 through FIG. 6 are flowcharts of example methods for using AI model cascades to filter data on a database system based on an artificial intelligence model prompt, according to some example embodiments of the present disclosure.

DETAILED DESCRIPTION

Figure 1:
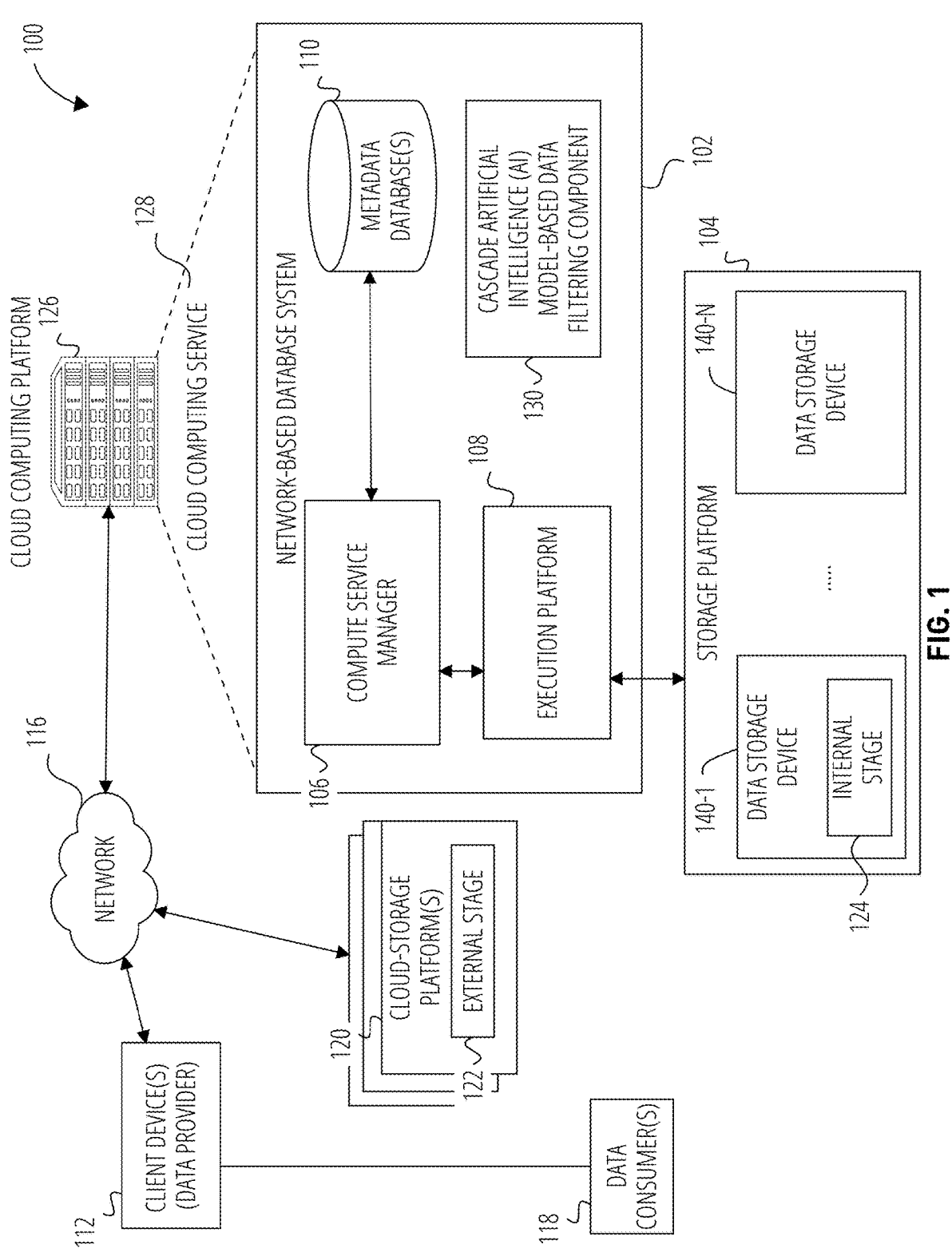
FIG. 1 illustrates an example computing environment comprising a database system in the example form of a network-based database system that includes a cascade AI model-based data filtering component, according to some example embodiments of the present disclosure.

Reference will now be made in detail to specific embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Database systems process vast amounts of information through query operations that filter, join, and aggregate data according to specified criteria. Modern database systems handle increasingly complex analytical workloads that span both structured and unstructured data types. Traditional query processing relies on deterministic algorithms and predefined logic to evaluate filtering conditions and perform data operations.

The integration of artificial intelligence models, such as machine learning models and language models (e.g., large language models (LLMs)), into database query processing has introduced new computational approaches for handling data analysis, especially unstructured data analysis. AI model-powered operations can be used to evaluate textual content, images, and other complex data formats that cannot be processed through conventional database operators. However, the computational overhead associated with inference by AI models (or AI model inference) presents scalability considerations for large-scale data processing environments. Unfortunately, some traditional approaches use a single foundation (artificial intelligence) model for all rows in a dataset, which can increase costs and slow performance without providing users control over cost-quality tradeoffs. While AI models, such as foundation models and LLMs, offer varying levels of computational complexity and accuracy across different model architectures, the selection of appropriate AI models for specific analytical tasks involves tradeoffs between processing speed, computational cost, and result quality. Database systems balance these (and other) factors while maintaining query performance standards expected in data system environments.

Various example embodiments described herein provide for systems, methods, devices, instructions, and the like for using AI model cascades to filter data on a data system, such as a database system, based on an artificial intelligence model prompt (e.g., user-provided prompt). In particular, various example embodiments enable a database system to use cascaded AI models with adaptive bounds (e.g., lower and upper score bounds for response confidence scores) to optimize data filtering operations based on an artificial intelligence model prompt (also referred to herein as just a prompt) while balancing computational cost and accuracy, which can be useful in processing large-scale data queries. Use of various example embodiments can enable a database system to use adaptive AI model selection and bounds to address performance bottlenecks when applying AI models to filter data.

The database system of various example embodiments uses a first artificial intelligence model and a second artificial intelligence model, where the first artificial intelligence model is computationally less expensive than the second artificial intelligence model. The second artificial intelligence model can be referred to as an oracle model, and the first artificial intelligence model can be referred to as a proxy model of the oracle model (or just proxy model). Various example embodiments implement a cascading approach in using the first and second artificial intelligence models, which enables such example embodiments to leverage the computational cost benefits of less expensive artificial intelligence models while approaching the performance levels of more expensive artificial intelligence models. For example, artificial intelligence model providers (e.g., foundation model providers) often offer multiple artificial intelligence models spanning different computational cost-quality tradeoffs, and the cascading logic of various example embodiments can leverage less computationally expensive artificial intelligence model options as proxies for answering user prompts. Additionally, the adaptive bounds (e.g., confidence score thresholds) on the first artificial intelligence model's confidence scores enables various example embodiments to use the results of the less computationally expensive first artificial intelligence model (e.g., the proxy model) when it is determined that the output of the first artificial intelligence model is "confident," and a more expensive second artificial intelligence model (e.g., oracle model) when the result of the first artificial intelligence model is less confident.

According to various example embodiments, the database system generates, for a set of rows, a set of first responses (e.g., "TRUE" and "FALSE" values for whether a classification described by an artificial intelligence model prompt) and a set of first response confidence scores by processing each row using the first artificial intelligence model based on an artificial intelligence model prompt. For example, the database system can implement this cascading logic (e.g., within an execution platform), where a user calls an AI filter (e.g., AI_FILTER) operator in a structured language data query (e.g., SQL query) for a data store (e.g., database), where the AI filter operation includes an AI model prompt (e.g., user-supplied AI model prompt) as a parameter, and where the (called) AI filter operator can interpolate the AI model prompt by one or more database table columns of the data store. The database system of various example embodiments maintains lower and upper score bounds that define a confidence score range for determining which rows require additional processing by a more computationally expensive second artificial intelligence model.

During query optimization, the database system can shuffle data to prevent order-induced bias, and can then generate first response confidence scores (also referred to herein as proxy scores) on all rows of the filter prompt. As described herein, the first response confidence scores can be computed by using (e.g., calling out to) the first AI model (e.g., large language model) with the same artificial intelligence model prompt and data. The first AI model can return log probabilities, and the database system can exponentiate those values to serve as first response confidence scores. Alternatively, when using the AI operator in the JOIN use case, first response confidence scores can be computed by using an embedding model to generate vector embeddings of each left-key and right-key field, and computing the vector similarity for the outer-product of left/right key combinations. The database system can partition incoming data comprising multiple rows (a plurality of rows) and can assign dynamically sized sets of rows (or rowsets) to a dynamically determined number of workers. In this way, the database system can iterate through a rowset at a time within the stream of worker rowsets.

The database system of various example embodiments performs iterative sub-operations per rowset while there is at least one row that has yet to be processed by the second AI model and that has a corresponding first response confidence score between the current iterative estimate of the lower score bound and the upper score bound, or when a predetermined percentage of the rowset has been sampled by the second AI model. During each iteration of sub-operations, the database system of various example embodiments determines (e.g., identifies) a set of rows to sample with the second artificial intelligence model by sampling from rows that have yet to be processed by the second artificial intelligence model. The database system of various example embodiments then processes each sampled row using the second artificial intelligence model based on the same artificial intelligence model prompt, with this processing being more computationally expensive than processing by the first artificial intelligence model.

Where the response confidence scores range between 0 and 1, the database system can initialize lower and upper score bounds to 0 and 1. During the iterations of sub-operations, the database system can use a sampling method proportional to the first response confidence scores, where the database system can randomly sample a batch of rows (e.g., for some fixed batch size) from a rowset, only for rows that have not been processed by the more computationally expensive second AI model. An example sample methodology can include known methodologies, such as a sampling methodology from "Approximate Selection with Guarantees using Proxies," arXiv:2004.00827 (2020) (e.g., Algorithm 4 or Algorithm 5). For instance, the sampling process can comprise: taking the square root of first response confidence scores; scaling the resulting values to sum to a value of one; taking a weighted average between the transformed first response confidence scores and a constant vector that sums to a value of one; using weighted random sampling with this averaged vector to determine which rows to call. In some example embodiments, the likelihood ratio will be retrained for use in lower/upper score bound estimation.

The database system of various example embodiments maintains cumulative data that retains the set of both first (e.g., proxy) and second (e.g., oracle) responses, including confidence scores, corresponding to the randomly sampled rows across iterations of the sub-operations. For example, the database system can call out to the second artificial intelligence model and pass the sampled rows to the more expensive second artificial intelligence model, and can append the results to a store of results. After each iteration, the database system of various example embodiments updates at least one of the lower score bound and the upper score bound based on this cumulative data, enabling adaptive refinement of the confidence thresholds. The database system can update (e.g., estimate) lower and upper score bounds based on the cumulative store of rows and based on first response confidence scores (e.g., proxy scores), second response confidence scores (e.g., oracle scores), or both. For instance, the database system can use a statistical methodology described in "Approximate Selection with Guarantees using Proxies," arXiv:2004.00827 (2020) (e.g., Algorithm 4 to estimate an updated lower score bound, and Algorithm 5 to estimate an updated upper score bound) or "Semantic Operators: A Declarative Model for Rich, AI-based Data Processing," arXiv:2407.11418 (2024). This iteration of sub-operations continues until no unprocessed rows remain with confidence scores falling between the bounds (e.g., until there are no longer any first response confidence scores between the updated lower and upper score bounds for rows that have not been processed by the second artificial intelligence model), or until a fixed percentage of the rowset has been randomly sampled. In the later event, then all remaining unsampled rows between the lower and upper score bounds are sampled by the second model. Depending on the example embodiment, the results from this operation are not used for future bounds re-estimation.

The database system of various example embodiments generates final responses corresponding to the set of rows based on either second responses from the cumulative data or first responses with their corresponding confidence scores. For rows processed by the second artificial intelligence model, the database system of various example embodiments uses the corresponding second response as the final response. For rows that remain unprocessed by the second model, the database system of various example embodiments generates negative responses for those with confidence scores below the lower score bound and positive responses for those with confidence scores above the upper score bound. All rows with first response confidence scores lower than the recently updated lower score bound can be assigned a "FALSE" value, and all rows with first response confidence scores above the recently updated upper score bound are assigned a "TRUE" value.

If there are additional unprocessed rowsets assigned to the worker, the database system can move onto the next rowset, but retains the updated bounds and the cumulative data (e.g., cumulative log) of the second artificial intelligence model outputs used to update (e.g., estimate) lower and upper score bounds. If there are no rowsets left, the database system can conclude processing. Optionally, a fixed maximum budget of calls to the second artificial intelligence model can be enforced, where the budget can be evenly shared across multiple workers (e.g., that are operating on the current structured language data query in parallel). Once one or more workers reach the limit on calls to the second artificial intelligence model, some example embodiments can use a midpoint between the most recent lower and upper score bounds for future rows-all first response confidence scores (e.g., proxy scores) below the midpoint are assigned "FALSE" value, and all first response confidence scores above are assigned "TRUE" value. This bounding is used for all subsequent worker rowsets.

The artificial intelligence model prompt can comprise instructions for classifying data, with the database system of various example embodiments supporting structured language data queries for data stores that include filter operators with filter operator parameters comprising the AI model prompt as filter criteria. The database system of various example embodiments can operate in distributed environments with multiple workers processing different portions of rows in parallel, where bound information can be shared across workers operating on the same machine (e.g., virtual or physical machine). For some example embodiments, query optimization logic is used to choose an appropriate method for calculating first response confidence scores (e.g., proxy scores) based on the specific use case and available computational resources. The first artificial intelligence model can comprise various model types including, for example, large language models returning log probabilities, embedding models using vector similarity calculations, or binary classifiers trained on previous second model responses.

The database system of various example embodiments is implemented as part of a database filtering operator (e.g., function), which may or may not support multimodal data processing. For instance, the database filtering operator can work with text, images, or other data formats (e.g., using unified operators that eliminate the need for separate processing systems). Additionally, the adaptive nature of estimating bounds allows the database system of some example embodiments to automatically adjust its behavior based on the characteristics of the data and the performance of the proxy models, providing users with cost-effective artificial intelligence capabilities without requiring manual tuning of model selection parameters.

Use of various example embodiments described herein enable a user (e.g., organization) to process large volumes of structure or unstructured data through artificial intelligence filtering operations while maintaining acceptable performance and cost characteristics. The integration of cascaded artificial intelligence models into database query processing (by various example embodiments) can reduce or eliminate the need for separate artificial intelligence processing pipelines, and can help reduce the complexity of implementing artificial intelligence-powered data analysis workflows.

As used herein, a data store can comprise a database. As used herein, a rowset can refer to a set of rows. Additionally, as used herein, an AI model can comprise one of several different types of models, which can include generative and non-generative models. For example, an AI model can comprise a language model, a machine learning (ML) model, a classifier (e.g., based on a neural network), an embedding model, or the like. As used herein, a language model can comprise an LLM, which can include, without limitation, a GPT model, a LLAMA model, a MISTRAL model, a Claude model, or another type of large language model (e.g., a proprietary or tailored, generative pre-trained transformer). Generally, an LLM can be constructed using deep learning techniques, such as neural networks, and trained to understand, predict, and generate output data (e.g., text, an image, an audio or a video) by learning patterns, semantics, syntax, and contextual meanings from input data (e.g., text, an image, an audio or a video). With respect to text, an LLM can operate by processing sequences of text and can perform various tasks, such as text completion, translation, summarization, question answering, and dialogue generation, with the ability to generalize across languages and domains based on the scale of training data. As used herein, a foundation model (e.g., foundation LLM) can comprise a large-scale AI model trained on broad and diverse datasets that can be adapted to a wide range of downstream tasks, often through fine-tuning or prompt engineering. Whereas a foundation model can provide general-purpose capabilities that can serve as a base for multiple specialized applications across modalities or domains, a non-foundation model, such as a task-specific model (e.g., task-specific LLM), can comprise an AI model trained or optimized for a narrow, well-defined function.

Reference will now be made in detail to various example embodiments of the present disclosure, examples of which are illustrated in the appended drawings. The present disclosure may, however, be embodied in many different forms and should not be construed as being limited to the examples set forth herein.

FIG. 1 illustrates an example computing environment 100 comprising a database system in the example form of a network-based database system 102 that includes a cascade AI model-based data filtering component 130, according to some example embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other example embodiments, the computing environment may comprise another type of network-based database system or a cloud data platform. For example, in some example embodiments, the computing environment 100 may include a cloud computing platform 126 with the network-based database system 102, and a storage platform 104 (also referred to as a cloud storage platform). The cloud comput- ing platform 126 provides computing resources and storage resources that may be acquired (purchased) or leased and configured to execute applications and store data.

The cloud computing platform 126 may host a cloud computing service 128 that facilitates storage of data on the cloud computing platform 126 (e.g., data management and access) and analysis functions (e.g., SQL queries, analysis), as well as other processing capabilities (e.g., configuring replication group objects as described herein). The cloud computing platform 126 may include a three-tier architec- ture: data storage (e.g., storage platforms 104), an execution platform 108 (e.g., providing query processing), and a compute service manager 106 providing cloud services.

It is often the case that organizations that are customers of a given data platform also maintain data storage (e.g., a data lake) that is external to the data platform (i.e., one or more external storage locations). For example, a company could be a customer of a particular data platform and also sepa- rately maintain storage of any number of files—be they unstructured files, semi-structured files, structured files, and/ or files of one or more other types—on, as examples, one or more of their servers and/or on one or more cloud-storage platforms such as AMAZON WEB SERVICES™ (AWS™), MICROSOFT® AZURE®, GOOGLE CLOUD PLAT- FORM™, and/or the like. The customer's servers and cloud- storage platforms are both examples of what a given cus- tomer could use as what is referred to herein as an external storage location. The cloud computing platform 126 could also use a cloud-storage platform as what is referred to herein as an internal storage location concerning the data platform.

From the perspective of the network-based database system 102 of the cloud computing platform 126, one or more files that are stored at one or more storage locations are referred to herein as being organized into one or more of what is referred to herein as either "internal stages" or "external stages." Internal stages (e.g., internal stage 124) are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud- storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementa- tions, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 126 is in communication with the storage platforms 104 and cloud-storage platforms 120 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 106, an execution platform 108, and one or more metadata databases 110. The network-based database system 102 hosts and provides data reporting and analysis services to multiple client accounts.

The compute service manager 106 coordinates and man- ages operations of the network-based database system 102. The compute service manager 106 also performs query optimization and compilation as well as managing clusters of computing services that provide compute resources (also referred to as "virtual warehouses"). The compute service manager 106 can support any number of client accounts such as end-users providing data storage and retrieval requests, system administrators managing the systems and methods described herein, and other components/devices that interact with compute service manager 106.

The compute service manager 106 is also in communi- cation with a client device 112. The client device 112 corresponds to a user of one of the multiple client accounts supported by the network-based database system 102. A user may utilize the client device 112 to submit data storage, retrieval, and analysis requests to the compute service man- ager 106. Client device 112 (also referred to as remote computing device or user client device 112) may include one or more of a laptop computer, a desktop computer, a mobile phone (e.g., a smartphone), a tablet computer, a cloud- hosted computer, cloud-hosted serverless processes, or other computing processes or devices may be used (e.g., by a data provider) to access services provided by the cloud comput- ing platform 126 (e.g., cloud computing service 128) by way of a network 116, such as the Internet or a private network. A data consumer 118 can use another computing device to access the data of the data provider (e.g., data obtained via the client device 112).

In the description below, actions are ascribed to users, particularly consumers and providers. Such actions shall be understood to be performed concerning client device (or devices) 112 operated by such users. For example, a noti- fication to a user may be understood to be a notification transmitted to the client device 112, input or instruction from a user may be understood to be received by way of the client device 112, and interaction with an interface by a user shall be understood to be interaction with the interface on the client device 112. In addition, database operations (joining, aggregating, analysis, etc.) ascribed to a user (consumer or provider) shall be understood to include performing such actions by the cloud computing service 128 in response to an instruction from that user.

The compute service manager 106 is also coupled to one or more metadata databases 110 that store metadata about various functions and aspects associated with the network-based database system 102 and its users. For example, a metadata database 110 may include a summary of data stored in remote data storage systems as well as data available from a local cache. Additionally, a metadata database 110 may include information regarding how data is organized in remote data storage systems (e.g., the cloud storage platform 104) and the local caches. Information stored by a metadata database 110 allows systems and services to determine whether a piece of data needs to be accessed without loading or accessing the actual data from a storage device. In some example embodiments, metadata database 110 is configured to store account object metadata (e.g., account objects used in connection with a replication group object).

Figure 3:
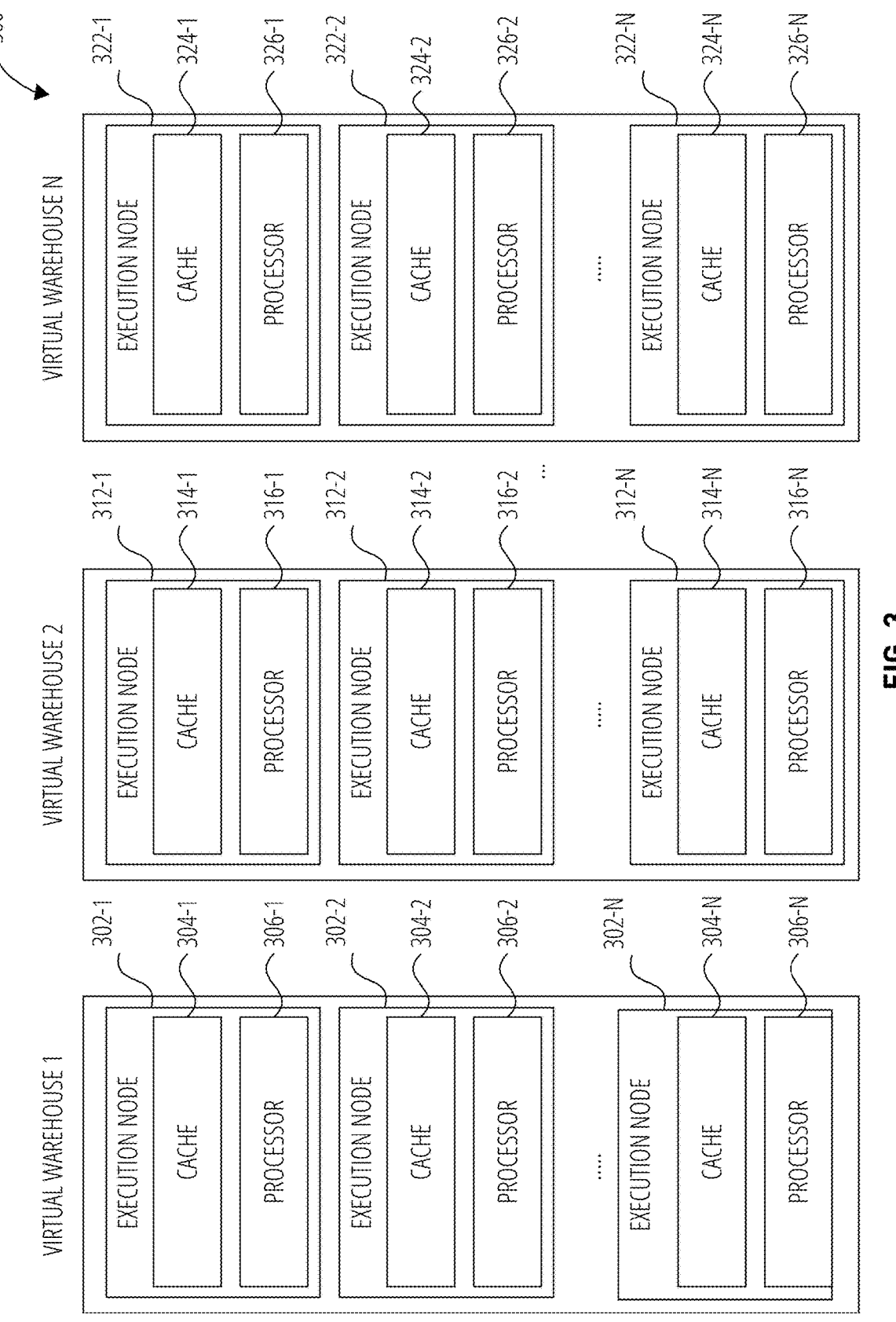
FIG. 3 is a block diagram illustrating components of an execution platform, according to some example embodiments of the present disclosure.

The compute service manager 106 is further coupled to the execution platform 108, which provides multiple computing resources that execute various data storage and data retrieval tasks. As illustrated in FIG. 3, the execution platform 108 comprises a plurality of compute nodes. The execution platform 108 is coupled to storage platform 104 and cloud-storage platforms 120. The storage platform 104 comprises multiple data storage devices 140-1 to 140-N. In some example embodiments, the data storage devices 140-1 to 140-N are cloud-based storage devices located in one or more geographic locations. For example, the data storage devices 140-1 to 140-N may be part of a public cloud infrastructure or a private cloud infrastructure. The data storage devices 140-1 to 140-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some example embodiments, at least one internal stage 124 may reside on one or more of the data storage devices 140-1-140-N, and at least one external stage 122 may reside on one or more of the cloud-storage platforms 120.

In some example embodiments, communication links between elements of the computing environment 100 are implemented via one or more data communication networks. These data communication networks may utilize any communication protocol and any type of communication medium. In some example embodiments, the data communication networks are a combination of two or more data communication networks (or sub-networks) coupled to one another. In alternative embodiments, these communication links are implemented using any type of communication medium and any communication protocol.

The compute service manager 106, metadata database(s) 110, execution platform 108, and storage platform 104, are shown in FIG. 1 as individual discrete components. However, each of the compute service manager 106, metadata database(s) 110, execution platform 108, and storage platform 104 may be implemented as a distributed system (e.g., distributed across multiple systems/platforms at multiple geographic locations). Additionally, each of the compute service manager 106, metadata database(s) 110, execution platform 108, and storage platform 104 can be scaled up or down (independently of one another) depending on changes to the requests received and the changing needs of the network-based database system 102. Thus, in the described example embodiments, the network-based database system 102 is dynamic and supports regular changes to meet the current data processing needs.

During a typical operation, the network-based database system 102 processes multiple jobs determined by the compute service manager 106. These jobs are scheduled and managed by the compute service manager 106 to determine when and how to execute the job. For example, the compute service manager 106 may divide the job into multiple discrete tasks and may determine what data is needed to execute each of the multiple discrete tasks. The compute service manager 106 may assign each of the multiple discrete tasks to one or more nodes of the execution platform 108 to process the task. The compute service manager 106 may determine what data is needed to process a task and further determine which nodes within the execution platform 108 are best suited to process the task. Some nodes may have already cached the data needed to process the task and, therefore, be a good candidate for processing the task. Metadata stored in a metadata database 110 assists the compute service manager 106 in determining which nodes in the execution platform 108 have already cached at least a portion of the data needed to process the task. One or more nodes in the execution platform 108 process the task using data cached by the nodes and, if necessary, data retrieved from the storage platform 104. It is desirable to retrieve as much data as possible from caches within the execution platform 108 because the retrieval speed is typically much faster than retrieving data from the storage platform 104.

As shown in FIG. 1, the cloud computing platform 126 of the computing environment 100 separates the execution platform 108 from the storage platform 104. In this arrangement, the processing resources and cache resources in the execution platform 108 operate independently of the data storage devices 140-1 to 140-N in the storage platform 104. Thus, the computing resources and cache resources are not restricted to specific data storage devices 140-1 to 140-N. Instead, all computing resources and all cache resources may retrieve data from, and store data to, any of the data storage resources in the storage platform 104.

As also shown, the network-based database system 102 comprises the cascade AI model-based data filtering component 130, which implements or enables use of cascaded artificial intelligence models to filter data on the network-based database system 102 based on a prompt (e.g., user-provided prompt provided in a structured language data query) in accordance with various example embodiments described herein.

Figure 2:
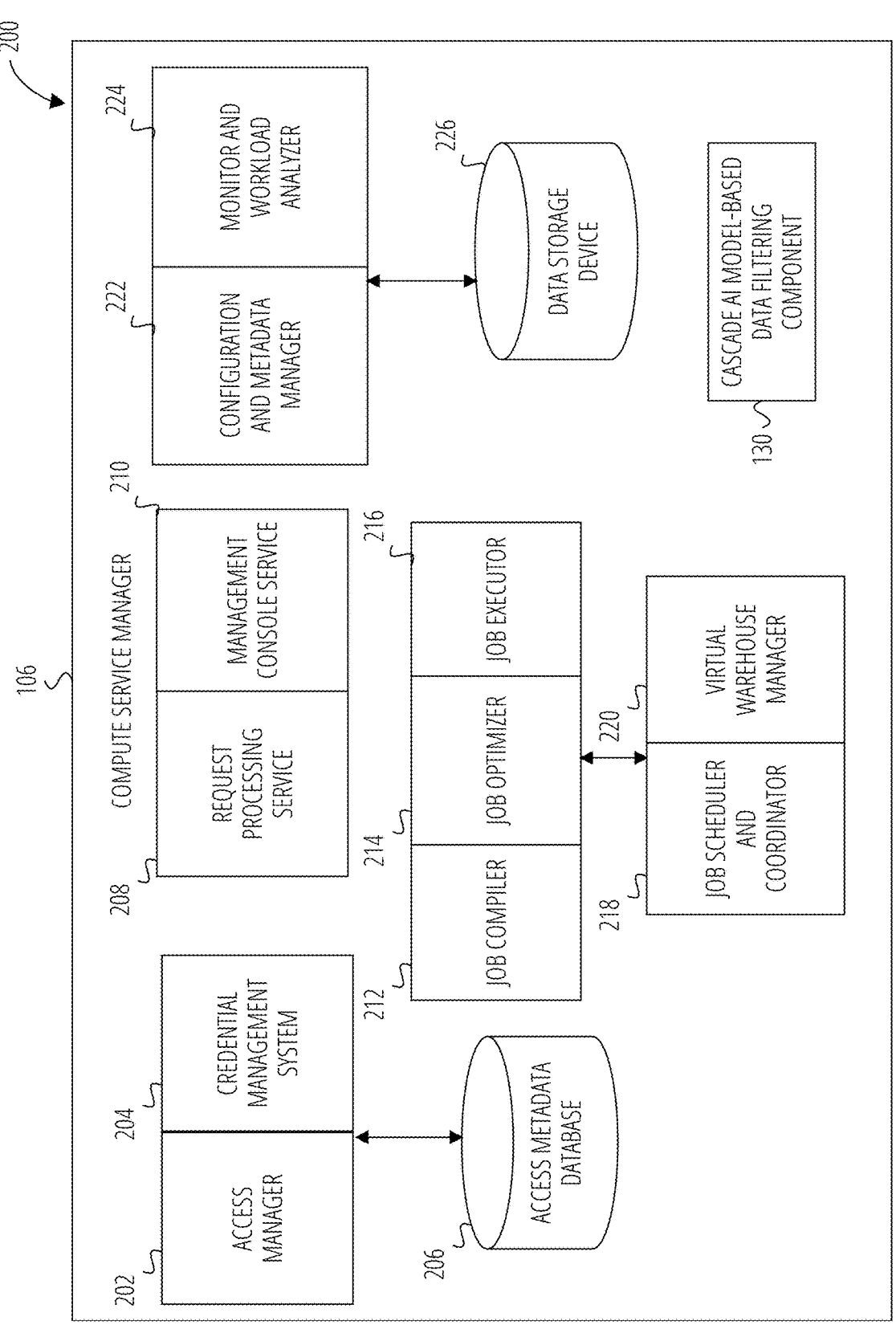
FIG. 2 is a block diagram illustrating components of a compute service manager, according to some example embodiments of the present disclosure.

FIG. 2 is a block diagram 200 illustrating components of the compute service manager 106, according to some example embodiments of the present disclosure. As shown in FIG. 2, the compute service manager 106 includes an access manager 202 and a credential management system 204 coupled to access metadata database 206, which is an example of the metadata database(s) 110.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data can be stored in a cache within the execution platform 108 or in a data storage device in storage platform 104.

A management console service 210 supports access to various systems and processes by administrators and other system managers. Additionally, the management console service 210 may receive a request to execute a job and monitor the workload on the system.

The compute service manager 106 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 106.

A job scheduler and coordinator 218 sends received jobs to the appropriate services or systems for compilation, optimization, and dispatch to the execution platform 108. For example, jobs can be prioritized and then processed in that prioritized order. In an embodiment, the job scheduler and coordinator 218 determines a priority for internal jobs that are scheduled by the compute service manager 106 with other "outside" jobs such as user queries that can be scheduled by other systems in the database but may utilize the same processing resources in the execution platform 108. In some example embodiments, the job scheduler and coordinator 218 identifies or assigns particular nodes in the execution platform 108 to process particular tasks. A virtual warehouse manager 220 manages the operation of multiple virtual warehouses implemented in the execution platform 108. For example, the virtual warehouse manager 220 may generate query plans for executing received queries.

Additionally, the compute service manager 106 includes a configuration and metadata manager 222, which manages the information related to the data stored in the remote data storage devices and in the local buffers (e.g., the buffers in execution platform 108). The configuration and metadata manager 222 uses metadata to determine which data files need to be accessed to retrieve data for processing a particular task or job. A monitor and workload analyzer 224 oversees processes performed by the compute service manager 106 and manages the distribution of tasks (e.g., workload) across the virtual warehouses and execution nodes in the execution platform 108. The monitor and workload analyzer 224 also redistributes tasks, as needed, based on changing workloads throughout the cloud computing platform 126 and may further redistribute tasks based on a user (e.g., "external") query workload that may also be processed by the execution platform 108. The configuration and metadata manager 222 and the monitor and workload analyzer 224 are coupled to a data storage device 226. Data storage device 226 in FIG. 2 represents any data storage device within the storage platform 104. For example, data storage device 226 may represent buffers in execution platform 108, storage devices in cloud storage platform 104, or any other storage device.

As described in embodiments herein, the compute service manager 106 validates all communication from an execution platform (e.g., the execution platform 108) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As shown, the compute service manager 106 includes the cascade AI model-based data filtering component 130, which can enable the compute service manager 106 to implement or enable one or more features for using cascade artificial intelligence models to filter data on the network-based database system 102 based on a prompt (e.g., user-provided prompt provided in a structured language data query) in accordance with various example embodiments described herein FIG. 3 is a block diagram 300 illustrating components of the execution platform 108, according to some example embodiments of the present disclosure. As shown in FIG. 3, the execution platform 108 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 108 can add new virtual warehouses and drop existing virtual warehouses in real-time based on the current processing needs of the systems and users. This flexibility allows the execution platform 108 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 140-1 to 140-N shown in FIG. 1. Thus, the virtual warehouses are not necessarily assigned to a specific data storage device 140-1 to 140-N and, instead, can access data from any of the data storage devices 140-1 to 140-N within the storage platform 104. Similarly, each of the execution nodes shown in FIG. 3 can access data from any of the data storage devices 140-1 to 140-N. In some example embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some example embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some example embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some example embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 108, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some example embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 108 is also fault tolerant. For example, if one virtual warehouse fails, that virtual warehouse is quickly replaced with a different virtual warehouse at a different geographic location. A particular execution platform 108 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some example embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 5:
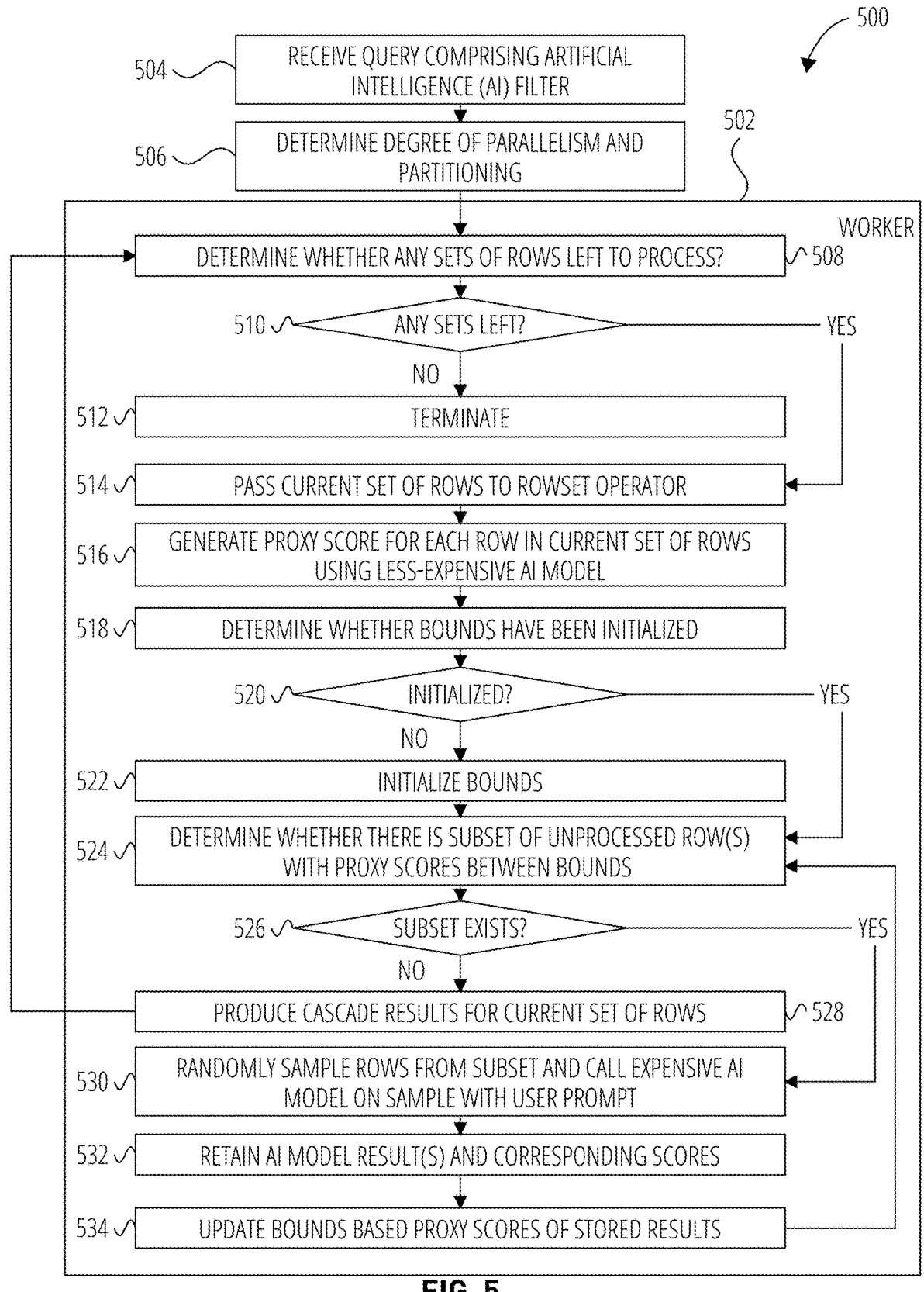

FIG. 4 through FIG. 6 are flowcharts of example methods 400, 500, and 600 for using AI model cascades to filter data on a database system based on an artificial intelligence model prompt, according to some example embodiments of the present disclosure. Any of methods 400, 500, and 600 may be embodied in computer-readable instructions for execution by one or more hardware components (e.g., one or more processors) such that the operations of the method can be performed by the cascade AI model-based data filtering component 130 or another component of the network-based database system 102, such as a network node (e.g., the cascade AI model-based data filtering component 130 executing on a network node of the compute service manager 106), which may be implemented as machine 700 of FIG. 7 performing the disclosed functions. Accordingly, any of methods described herein, by way of example with reference thereto. However, it shall be appreciated that any method described herein may be deployed on various other hardware configurations and is not intended to be limited to deployment within the network-based database system 102.

At operation 402, a processor (e.g., implementing the cascade AI model-based data filtering component 130) receives a structured language data query for a data store, such as a database, where the structured language data query comprises a filter operator (e.g., AI filter operator or function) and a filter operator parameter comprising an artificial intelligence (AI) prompt. For some example embodiments, the structured language data query is received from a client device via a network interface, where the processor causes the structured language data query to be processed for filtering operations on the data store. The artificial intelligence model prompt can comprise a user-provided prompt (e.g., received from a user by way of a graphical user interface on a client device) that becomes part of the structured language data query. According to some example embodiments, the AI prompt (of the filter operator parameter comprises) serves as a filter criterion for the filter operator to enable filtering of data rows (of the data store) based on artificial intelligence model processing. During processing, the filter operator (or function) can cause the artificial intelligence model prompt to be interpolated with data from one or more table columns of the data store. An example of a structured language data query (e.g., SQL query) that comprises a filter operator (e.g., AI_FILTER) and a filter operator parameter comprising an artificial intelligence model prompt (e.g., PROMPT ('The reviewer enjoyed the restaurant: {0}', review))) is provided in Table 1.

TABLE 1

WITH reviews AS ( SELECT 'Wow . . . Loved this place.' AS review UNION ALL SELECT 'The pizza is not good.' ) SELECT * FROM reviews WHERE AI_FILTER(PROMPT ( 'The reviewer enjoyed the restaurant: {0}', review));

During operation 404, the processor (e.g., implementing the cascade AI model-based data filtering component 130) determines, based on the structured language data query, a plurality of rows from the data store (e.g., database) to be filtered by the filter operator. For various example embodiments, the determination of the plurality of rows involves parsing the structured language data query to identify the target data store and the scope of rows to be processed by the filter operator. In some example embodiments, the plurality of rows represents the initial dataset that will be subject to the cascade artificial intelligence filtering process described herein.

For some example embodiments, the database system (e.g., 102) performing method 400 is a distributed system that comprises a plurality of workers operating in parallel on different portions of the plurality of rows, which can optimize computational efficiency and enable distributed processing of the (artificial intelligence) filtering operations. Accordingly, at operation 406, the processor can partition the plurality of rows into two or more sets of rows, which can enable parallel filter processing (by the filter operator/function) of different portions (e.g., different sets) of the plurality of rows across multiple workers or processing nodes. Depending on the example embodiment, the plurality of rows can be partitioned based on a predetermined size, which can be determined based on a number of factors, including for example resource (e.g., worker or processing node) availability. Each individual worker or processing node assigned a set of rows can process its assigned set of rows by performing operations 408 through 414 of method 400. Where there is only one individual worker or processing node, operation 404 can be skipped and all of the plurality of rows can be assigned to that one individual worker/processing node for filter processing by the filter operator/function.

During operation 408, a processor (e.g., of an individual worker/processing node of the database system) generates, for a select set of rows (e.g., assigned to an individual worker performing operations operation 408 through 414) of the plurality of rows, a set of first responses (e.g., proxy responses or results) and a set of first response confidence scores. For various example embodiments, the generation comprises processing each row of the select set of rows using (e.g., performing inferences using) a first artificial intelligence model (e.g., proxy model) based on the artificial intelligence model prompt. In some example embodiments, the first artificial intelligence model is computationally less expensive than a second artificial intelligence model (e.g., oracle model) that will be used in subsequent operations. Depending on the example embodiment, the first artificial intelligence model can comprise a first language model, such an LLM, and the second artificial intelligence model can comprise a second language model, such as another LLM. Alternatively, or additionally, the first artificial intelligence model can comprise a non-foundation model, and the second artificial intelligence model can comprise a foundation model. According to some example embodiments, the first artificial intelligence model is used as a proxy model (for the oracle model) to generate initial responses and confidence scores for efficient pre-screening of the data rows. Where the artificial intelligence model prompt an instruction for filtering data by classifying data (e.g., prompt asks whether the data belongs to a class or not), each of the first responses can comprise a Boolean classification value. For instance, a given first response can comprise a value (e.g., text or numeric value) that indicates a positive classification response (e.g., "TRUE") that data is a member of a class specified by the artificial intelligence model prompt, or a value (e.g., text or numeric value) that indicates a negative classification response (e.g., "FALSE") that data is not a member of the class specified by the artificial intelligence model prompt. For some example embodiments, a positive classification response for data results in the data not being filtered by the filter operator, and a negative classification response for the data results in the data being filtered out by the filter operator.

The methodology for generating first response confidence score confidence scores can differ between different example embodiments. For instance, where the first artificial intelligence model comprises a large language model that returns log probabilities for generated tokens, each first response confidence score of the set of first response confidence scores can be determined (e.g., derived) based on one or more log probabilities provided by the large language model with a corresponding first response. Alternatively, where the first artificial intelligence model comprises an embedding model, and each first response confidence score in the set of first response confidence scores can be determined (e.g., calculated) based on a vector similarity between embeddings generated by the first artificial intelligence model for the artificial intelligence model prompt and data in a corresponding row of the set of rows.

When method 400 is filter processing an initial set of rows (from the plurality of rows) a lower score bound and an upper score bound used by method 400 may not be initialized (e.g., with initial values). Accordingly, for some example embodiments, prior to operation 410, the processor can determine whether the lower score bound and the upper score bound have been initialized and, if not, the processor can initialize the lower score bound and the upper score bound based on respective default values. For instance, where response confidence scores have a value range of 0 to 1, the lower score bound can be initialized to a value of 0 and the upper score bound can be initialized to a value of 1.

At operation 410, the processor (e.g., of the individual worker/processing node) determines whether there are any unprocessed rows of the select set of rows that have yet to be processed by the second artificial intelligence model (e.g., oracle model) and that have a corresponding first response confidence score between a lower score bound and an upper score bound. For some example embodiments, this determination establishes the criteria for identifying rows that will be further processed using the more computationally expensive second artificial intelligence model, and which rows have first responses that have a sufficient confidence (e.g., have a sufficient first response confidence score). Various example embodiments use the lower score bound and upper score bound to define a range of uncertainty where additional artificial intelligence processing is warranted to improve accuracy.

During operation 412, the processor (e.g., of the individual worker/processing node) iteratively performs operations 416 through 420 while there is at least one unprocessed row of the select set of rows having a corresponding first response confidence score between the lower score bound and the upper score bound. Within this description, operations 416 through 420 can be regarded as sub-operations of operation 412. According to some example embodiments, the operations 416, 418, and 420 form a cascade processing loop that can progressively refine the filtering results. In some example embodiments, the iterative nature enables adaptive processing where the bounds are updated based on cumulative learning from processed samples.

At operation 416, the processor (e.g., of the individual worker/processing node) determines (e.g., identifies) a set of sampled rows by sampling, from the select set of rows, a set of unprocessed rows that have yet to be processed by the second artificial intelligence model and that have corresponding first response confidence scores between the lower score bound and the upper score bound. Depending on the example embodiment, the set of sampled rows sampled from the select set of rows can comprise a fixed batch size of rows, regardless of a total size of the select set of rows.

Additionally, the sampling can comprise a methodology that implements random sampling. For example, the sampling of the set of unprocessed rows from the set of rows can comprise determining a square root of the first response confidence scores for all unprocessed rows in the set of rows that have yet to be processed by the second artificial intelligence model and that have a corresponding first response confidence score between the lower score bound and the upper score bound. The resulting values can be summed to a value of one, and then a weighted average can be determined (e.g., computed) between the scaled values and a constant vector that sums to the value of one. Eventually, the processor can perform weighted sampling of the subset of unprocessed rows from the set of rows using the weighted average to determine which rows to include in the subset of unprocessed rows. For various example embodiments, the sampling process selects a subset of the unprocessed rows to balance computational efficiency with accuracy improvement.

During operation 418, the processor (e.g., of the individual worker/processing node) generates a set of second responses (e.g., oracle results or responses) that correspond to the set of sampled rows by processing each row of the set of sampled rows using (e.g., performing inferences using) the second artificial intelligence model based on the artificial intelligence model prompt. For some example embodiments, the set of second responses and a subset of the set of first response confidence scores that correspond to the set of sampled rows are added to cumulative data. Where the second artificial intelligence model also generates corresponding (second response) confidence scores for the set of sampled rows, those second response confidence scores can also be added to the cumulative data. As described herein, for various example embodiments, performing an inference using the second artificial intelligence model is more computationally expensive than performing the same inference using the first artificial intelligence model. Accordingly, the processing of each row of the set of sampled rows using the second artificial intelligence model is understood to be more computationally expensive than processing each row of the set of sampled rows using the first artificial intelligence model.

According to various example embodiments, the cumulative data is retained across iterations of operations 416 through 420. Depending on the example embodiment, the cumulative data can be retained in the memory of the second artificial intelligence model, or can be stored in a data store (e.g., database). Additionally, the cumulative data can be collectively shared with other workers/processing nodes (e.g., that are processing other portions of the plurality of rows). Some example embodiments implement a forget mechanism that causes retention of only a predetermined number of the most recent second artificial intelligence model results and corresponding scores in the cumulative data (e.g., based on available resources). Further, for some example embodiments, the cumulative data is retained (e.g., cached) on a per query basis or on a per customer/account basis, and the learning process restarts from scratch with each new query (e.g., different data or different prompt) or with each new customer/account.

At operation 420, the processor (e.g., of the individual worker/processing node) updates at least one of the lower score bound and the upper score bound based on at least a portion of the cumulative data. According to some example embodiments, the updating of the bounds enables adaptive learning where the system progressively refines the criteria for determining which rows require processing by the expensive second artificial intelligence model. Depending on the example embodiment, each of the lower score bound and the upper score bound can be updated based on the second responses in the cumulative data, corresponding first response confidence scores in the cumulative data, corresponding second response confidence scores in the cumulative data, or some combination thereof. For example, the updating of either the lower score bound or the upper score bound can use statistical methodologies (e.g., statistical analysis of the cumulative data), such as applying algorithms for estimating lower bounds and upper bounds based on the correlation between first response confidence scores (e.g., proxy scores) and second responses (e.g., oracle responses or results) contained in the cumulative data. Statistical analysis of the cumulative data can optimize the balance between computational efficiency and filtering accuracy. Some example embodiments implement the bound updating by analyzing the cumulative collection of first response confidence scores (e.g., proxy scores) paired with corresponding second responses (e.g., oracle Boolean outputs) to determine threshold values (e.g., bounds) that optimize recall and precision metrics. The lower score bound and upper score bound can be dynamically adjusted across multiple iterations within a single row set and can be retained across multiple row sets processed by the same worker, enabling the bounds to converge toward more efficient threshold values as more cumulative data becomes available. In some example embodiments, the adaptive nature of the bound updating allows the system to automatically adjust to varying data characteristics and proxy model performance without requiring manual threshold tuning, thereby providing improved computational efficiency compared to static threshold approaches. Where the database system (e.g., 102) performing method 400 is a distributed system that comprises a plurality of workers operating in parallel on different portions of the plurality of rows, bound information (e.g., comprising the current lower score bound and the current upper score bound) can be shared across multiple workers of the plurality of workers (e.g., multiple workers on the same virtual machine or physical machine).

At the end of operation 412, the processor redetermines whether there are any unprocessed rows of the select set of rows that have yet to be processed by the second artificial intelligence model (e.g., oracle model) and that have a corresponding first response confidence score between the lower score bound and the upper score bound as determined (e.g., updated) by operation 420. If yes, operation 412 performs another iteration of operations 416 through 420, otherwise operation 412 ends.

During operation 414, the processor (e.g., of the individual worker/processing node) generates a set of final responses (e.g., cascade results) corresponding to the select set of rows based on at least one of: one or more second responses from the cumulative data; or one or more first responses from the set of first responses and one or more corresponding first response confidence scores from the set of first response confidence scores. For various example embodiments, operation 414 generates the final responses by combining results from both the first artificial intelligence model and the second artificial intelligence model to produce optimized filtering outcomes. In particular, some example embodiments determine the final response for each row based on whether the row was processed by the second artificial intelligence model or whether the row's first response confidence score falls outside the bounds requiring additional processing. For instance, for each row of the set of rows that was sampled and processed by the second artificial intelligence model, the processor can use a corresponding second response from the cumulative data as the final response for that row. For each row of the set of rows that remains unprocessed by the second artificial intelligence model and that has a corresponding first response confidence score below the lower score bound, the process can generate a negative response as the final response for that row. Additionally, for each row of the set of rows that remains unprocessed by the second artificial intelligence model and that has a corresponding first response confidence score above the upper score bound, the processor can generate a positive response as the final response for that row. As described herein, where the artificial intelligence model prompt comprises an instruction for classifying data, the negative response can comprise a negative classification response, and the positive response can comprise a positive classification response.

Though not illustrated, a processor of a database system (e.g., 102) can monitor for when a maximum budget of calls to the second artificial intelligence model has been reached by an individual worker/processing node of the database system or collectively by multiple workers/processing nodes of the database system. Based on (e.g., in response to) determining that the maximum budget has been reached or exceeded (e.g., by an individual worker/processing node or collectively by multiple worker/processing nodes), the processor (e.g., of an individual worker/processing node) can determine a midpoint value between the lower score bound and the upper score bound and, for a subset of the set of sampled rows that remain to be processed by the second artificial intelligence model: assign a negative response to each row in the subset of sampled rows that have a corresponding first response confidence score below the midpoint value; and assign a positive response to each row in the subset of sampled rows having a corresponding first response confidence score above the midpoint value. This is done for the subset of the set of sampled rows in place of using (e.g., making more inference calls to) the second artificial intelligence model (e.g., to process rows of the subset of the set of sampled rows).

Referring now to FIG. 5, method 500 represents an example implementation of method 400 of FIG. 4 implemented with respect to an individual worker 502. At operation 504, a processor of a (distributed) database system receives a structured language data query comprising an AI filter. For some example embodiments, the structured language data query comprises a filter operator and a filter operator parameter comprising an artificial intelligence model prompt, thereby forming an artificial intelligence filter query. According to some example embodiments, the worker 502 operates as one of multiple parallel processing nodes within an execution platform (e.g., 108) of a network-based database system (e.g., 102), where each worker (e.g., worker 502) processes a subset of the overall data filtering workload.

At operation 506, the processor of the database system determines a degree of parallelism and partitioning of rowsets for the received structured language data query. For various example embodiments, the determination involves analyzing the query requirements and available system resources to optimize the distribution of processing tasks across multiple workers and rowsets. In some example embodiments, the partitioning decision dynamically determines both the number of workers to be utilized and the size of rowsets to be processed by each worker, where rowsets can have a maximum size constraint (e.g., 4096 rows) to balance memory usage and processing efficiency. Some example embodiments implement the partitioning to maximize parallelism while ensuring optimal resource utilization across the distributed database system.

During operation 508, a processor of the worker 502 determines whether any sets of rows are left to process for the current worker 502. According to some example embodiments, this determination involves checking whether additional rowsets have been assigned to the individual worker 502 for processing. The decision block 510 evaluates whether any rowsets are left, and if no additional rowsets remain for processing, method 500 proceeds to operation 512, where the worker 502 terminates its processing. For some example embodiments, the termination at operation 512 indicates that the worker has completed its assigned portion of the overall filtering task and releases its computational resources back to the system.

If sets of rows remain for processing by the worker 502, at operation 514, the processor of the worker 502 passes the current set of rows to a rowset operator. For various example embodiments, the rowset operator receives the current set of rows and prepares them for proxy score generation and subsequent cascade processing. In some example embodiments, the passing of the current set of rows involves transferring a batch of data rows (e.g., up to 4096 rows) from the worker 502's assigned rowsets to the processing pipeline for artificial intelligence-based filtering operations.

At operation 516, the processor of the worker 502 generates a proxy score for each row in the current set of rows using a less-expensive artificial intelligence model (e.g., proxy model). According to some example embodiments, the proxy score generation involves processing each row with a computationally efficient artificial intelligence model that produces a confidence score between 0 and 1, where the proxy scores serve as preliminary assessments of whether each row satisfies the artificial intelligence filter criteria. For some example embodiments, the less-expensive artificial intelligence model can comprise a language model that returns log-probabilities which are then exponentiated to produce proxy scores, or alternatively, in join use cases, the proxy scores can be computed using vector embeddings and similarity calculations between left-key and right-key fields. Various example embodiments implement the proxy score generation using batch processing (e.g., batch size of 24) to optimize the computational efficiency of the less-expensive artificial intelligence model calls.

During operation 518, the processor of worker 502 determines whether lower and upper score bounds have been initialized for the current worker. The decision block 520 evaluates whether the lower and upper score bounds have been initialized, and if not, method 500 proceeds to operation 522 where the processor of the worker 502 initializes the lower and upper score bounds. For some example embodiments, the bound initialization at operation 522 sets initial lower and upper score bounds (e.g., initially set to 0 and 1, respectively) that define threshold values for determining when the more expensive artificial intelligence model (e.g., oracle model) should be used. According to some example embodiments, the lower and upper score bounds are retained across multiple rowsets processed by the same worker 502, enabling adaptive learning and convergence toward more efficient threshold values as additional cumulative data becomes available.

At operation 524, the processor of the worker 502 determines whether there is a subset of unprocessed rows with proxy scores between the initialized lower and upper score bounds. For various example embodiments, this determination identifies rows that have proxy scores falling within the uncertainty range defined by the lower and upper score bounds, indicating that these rows require additional processing by the more expensive artificial intelligence model (e.g., oracle model) for accurate classification. The decision block 526 evaluates whether such a subset exists, and if no subset exists (e.g., all unprocessed rows have proxy scores outside the bounds indicating high confidence), method 500 proceeds to operation 528, where the processor of worker 502 produces cascade results for the current set of rows.

If a subset exists at decision block 526, method 500 proceeds to operation 530, where the processor of worker 502 randomly samples rows from the subset and calls an expensive artificial intelligence model (e.g., oracle model) on the sample with the artificial intelligence model prompt. For some example embodiments, the random sampling implements sophisticated sampling strategies that balance computational efficiency with accuracy improvement, where the sampling method may involve transforming proxy scores (e.g., taking square roots and scaling to sum to 1), computing weighted averages with constant vectors, and using weighted sampling to determine which rows to process. In some example embodiments, the expensive artificial intelligence model comprises a foundation model accessed through an inference service that provides more accurate but computationally costly artificial intelligence processing compared to the less expensive artificial intelligence model (e.g., proxy model).

During operation 532, the processor retains the artificial intelligence model results and corresponding scores from the expensive artificial intelligence model processing. According to some example embodiments, the retention involves storing the Boolean outputs from the expensive artificial intelligence model along with the corresponding proxy scores in cumulative data that persists across multiple iterations and rowsets. For various example embodiments, the retained results include both the oracle model outputs and the likelihood ratios necessary for statistical bound estimation, where the cumulative storage enables progressive refinement of the filtering accuracy.

At operation 534, the processor of the worker 502 updates the lower and upper score bounds based on the proxy scores of the stored results. For some example embodiments, the bound updating uses statistical methodologies that apply algorithms for estimating lower bounds and upper bounds based on the correlation between proxy scores and oracle results contained in the cumulative data. Various example embodiments implement the bound updating by analyzing the cumulative collection of proxy scores paired with corresponding oracle Boolean outputs to determine threshold values that optimize recall and precision metrics. According to some example embodiments, the lower score bound and upper score bound are dynamically adjusted using statistical algorithms that estimate confidence thresholds based on the accumulated oracle model results and their corresponding proxy scores.

After operation 534, method 500 returns to operation 524, where the processor of the worker 502 determines whether additional unprocessed rows with proxy scores between the updated bounds require further processing, creating an iterative refinement loop that continues until all rows in the current set have been appropriately classified or the bounds converge to exclude remaining unprocessed rows. According to some example embodiments, this iterative process enables the cascade artificial intelligence filtering system to approach the computational cost of less expensive models while achieving the accuracy performance of more expensive models through intelligent selective application of the computationally costly artificial intelligence processing.

Referring now to FIG. 6, method 600 represents a variation of a portion of method 500 of FIG. 5. In particular, method 500 includes operations 602 through 606, where sub-operations are iteratively performed until a fixed percentage of the rowset has been randomly sampled. All remaining unsampled rows falling between the lower and upper score bounds are then processed by the more computationally expensive second model.

As shown for method 600, at operation 524, the processor (e.g., of the worker 502) determines whether there is a subset of unprocessed rows with proxy scores between the initialized lower and upper score bounds. The decision block 526 evaluates whether such a subset exists, and if no subset exists (e.g., all unprocessed rows have proxy scores outside the bounds indicating high confidence), method 600 proceeds to operation 528, where the processor produces cascade results for the current set of rows. However, if processed determines at 526 that a subset exists, method 600 proceeds to operation 602, where the processor determines whether a fixed percentage (e.g., based on used-defined percentage value) of the subset of unprocessed rows have already been sampled. From operation 602, method 600 proceeds to decision block 604.

If a fixed percentage of the subset of unprocessed rows have already been sampled at decision block 604, method 600 proceeds to operation 606, where the processor (e.g., of worker 502) calls an expensive artificial intelligence model (e.g., oracle model) on all rows of the subset of unprocessed rows with the artificial intelligence model prompt. After operation 606, method 600 proceeds to operation 528, where the processor produces cascade results for the current set of rows. If a fixed percentage of the subset of unprocessed rows has not already been sampled at decision block 604, method 600 proceeds to operation 530, where the processor (e.g., of worker 502) randomly samples rows from the subset and calls an expensive artificial intelligence model (e.g., oracle model) on the sample with the artificial intelligence model prompt.

Figure 7:
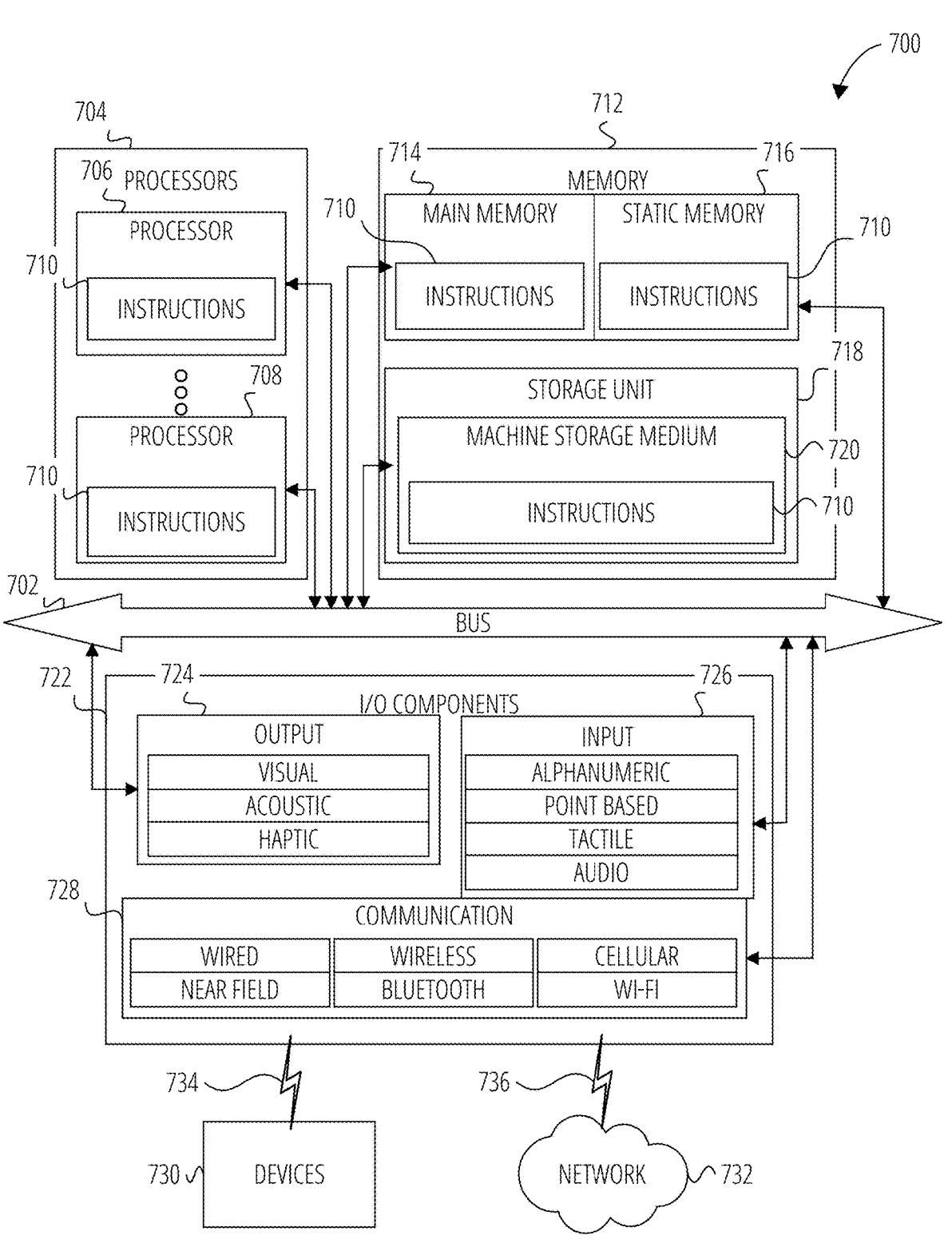
FIG. 7 illustrates a diagrammatic representation of a machine in the form of a computer system within which a set of instructions can be executed for causing the machine to perform any one or more of the methodologies discussed herein, according to some example embodiments of the present disclosure.

FIG. 7 illustrates a diagrammatic representation of a machine 700 in the form of a computer system within which a set of instructions can be executed for causing the machine 700 to perform any one or more of the methodologies discussed herein, according to some example embodiments of the present disclosure. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein can be executed. For example, the instructions 710 may cause the machine 700 to execute any one or more operations of any one or more of the methods described herein. As another example, the instructions 710 may cause the machine 700 to implement portions of the data flows described herein. In this way, the instructions 710 transform a general, non-programmed machine into a particular machine 700 (e.g., the compute service manager 106, the execution platform 108, client device 112) that is specially configured to carry out any one of the described and illustrated functions in the manner described herein.

In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines machine 700 that individually or jointly execute the instructions 710 to perform any one or more of the methodologies discussed herein.

The machine 700 includes processors 704, memory 712, and input/output (I/O) components 722 configured to communicate with each other such as via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 706 and a processor 708 that may execute the instructions 710. The term "processor" is intended to include multi-core processors 704 that may comprise two or more independent processors (sometimes referred to as "cores") that may execute instructions 710 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 712 may include a main memory 714, a static memory 716, and a storage unit 718, all accessible to the processors 704 such as via the bus 702. The main memory 714, the static memory 716, and the storage unit 718 comprising a machine storage medium 720 may store the instructions 710 embodying any one or more of the methodologies or functions described herein. The instructions 710 may also reside, completely or partially, within the main memory 714, within the static memory 716, within the storage unit 718, within at least one of the processors 704 (e.g., within the processor's cache memory), or any suitable combination thereof, during execution thereof by the machine 700.

The I/O components 722 include components to receive input, provide output, produce output, transmit information, exchange information, capture measurements, and so on. The specific I/O components 722 that are included in a particular machine 700 will depend on the type of machine. For example, portable machines such as mobile phones will likely include a touch input device or other such input mechanisms, while a headless server machine will likely not include such a touch input device. It will be appreciated that the I/O components 722 may include many other components that are not shown in FIG. 7. The I/O components 722 are grouped according to functionality merely for simplifying the following discussion and the grouping is in no way limiting. In various example embodiments, the I/O components 722 may include output components 724 and input components 726. The output components 724 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 722 may include communication components 728 operable to couple the machine 700 to a network 732 via a coupling 736 or to devices 730 via a coupling 734. For example, the communication components 728 may include a network interface component or another suitable device to interface with the network 732. In further examples, the communication components 728 may include wired communication components, wireless communication components, cellular communication components, and other communication components to provide communication via other modalities. The devices 730 can be another machine or any of a wide variety of peripheral devices (e.g., a peripheral device coupled via a universal serial bus (USB)). For example, as noted above, the machine 700 may correspond to any client device, the compute service manager 106, the execution platform 108, and the devices 730 may include any other of these systems and devices.

The various memories (e.g., 712, 714, 716, and/or memory of the processor(s) 704 and/or the storage unit 718) may store one or more sets of instructions 710 and data structures (e.g., software) embodying or utilized by any one or more of the methodologies or functions described herein. These instructions 710, when executed by the processor(s) 704, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 732 can be an ad hoc network, an intranet, an extranet, a virtual private network (VPN), a local-area network (LAN), a wireless LAN (WLAN), a wide-area network (WAN), a wireless WAN (WWAN), a metropolitanarea network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 732 or a portion of the network 732 may include a wireless or cellular network, and the coupling 736 can be a Code Division Multiple Access (CDMA) connection, a Global System for Mobile communications (GSM) connection, or another type of cellular or wireless coupling. In this example, the coupling 736 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 710 can be transmitted or received over the network 732 using a transmission medium via a network interface device (e.g., a network interface component included in the communication components 728) and utilizing any one of a number of well-known transfer protocols (e.g., hypertext transfer protocol (HTTP)). Similarly, the instructions 710 can be transmitted or received using a transmission medium via the coupling 734 (e.g., a peer-to-peer coupling) to the devices 730. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 710 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other example embodiments the processors may be distributed across several locations.

Described implementations of the subject matter can include one or more features, alone or in combination as illustrated below by way of examples.

Example 1 is a system comprising: at least one processor; and at least one memory storing instructions that cause the at least one processor to perform operations comprising: generating, for a set of rows, a set of first responses and a set of first response confidence scores by processing each row of the set of rows using a first artificial intelligence model based on an artificial intelligence model prompt; while there is at least one unprocessed row of the set of rows having a corresponding first response confidence score between a lower score bound and an upper score bound, iteratively performing sub-operations comprising: generating a set of sampled rows by sampling, from the set of rows, a set of unprocessed rows that have yet to be processed by a second artificial intelligence model and that have corresponding first response confidence scores between the lower score bound and the upper score bound; generating a set of second responses that correspond to the set of sampled rows by processing each row of the set of sampled rows using the second artificial intelligence model based on the artificial intelligence model prompt, the set of second responses and a subset of the set of first response confidence scores that correspond to the set of sampled rows being added to cumulative data, the cumulative data being retained across iterations of the sub-operations, the processing of each row of the set of sampled rows using the second artificial intelligence model being more computationally expensive than processing each row of the set of sampled rows using the first artificial intelligence model; and updating at least one of the lower score bound and the upper score bound based on at least a portion of the cumulative data; and generating a set of final responses corresponding to the set of rows based on at least one of: one or more second responses from the cumulative data; or one or more first responses from the set of first responses and one or more corresponding first response confidence scores from the set of first response confidence scores.

In Example 2, the subject matter of Example 1 includes, wherein the operations comprise: determining whether there are any unprocessed rows of the set of rows that have yet to be processed by the second artificial intelligence model and that have a corresponding first response confidence score between the lower score bound and the upper score bound.

In Example 3, the subject matter of Examples 1-2 includes, wherein the artificial intelligence model prompt comprises an instruction for classifying data.

In Example 4, the subject matter of Examples 1-3 includes, wherein the generating of the set of final responses corresponding to the set of rows comprises: for each row of the set of rows that was sampled and processed by the second artificial intelligence model, using a corresponding second response from the cumulative data as the final response for that row; for each row of the set of rows that remains unprocessed by the second artificial intelligence model and that has a corresponding first response confidence score below the lower score bound, generating a negative response as the final response for that row; and for each row of the set of rows that remains unprocessed by the second artificial intelligence model and that has a corresponding first response confidence score above the upper score bound, generating a positive response as the final response for that row.

In Example 5, the subject matter of Example 4 includes, wherein the artificial intelligence model prompt comprises an instruction for classifying data, wherein the negative response comprises a negative classification response, and wherein the positive response comprises a positive classification response.

In Example 6, the subject matter of Examples 1-5 includes, wherein the operations comprise: receiving a structured language data query for a data store, the structured language data query comprising a filter operator and a filter operator parameter, the filter operator parameter comprising the artificial intelligence model prompt that serves as a filter criterion for the filter operator; and determining, based on the structured language data query, the set of rows from the data store to be filtered by the filter operator.

In Example 7, the subject matter of Examples 1-6 includes, wherein the set of rows is a select set of rows, and wherein the operations comprise: receiving a structured language data query for a data store, the structured language data query comprising a filter operator and a filter operator parameter, the filter operator parameter comprising the artificial intelligence model prompt that serves as a filter criterion for the filter operator; determining, based on the structured language data query, a plurality of rows from the data store to be filtered by the filter operator; and partitioning the plurality of rows into two or more sets of rows that include the select set of rows.

In Example 8, the subject matter of Example 7 includes, wherein the system is a distributed system, wherein the distributed system comprises a plurality of workers operating in parallel on different portions of the plurality of rows, wherein the at least one processor is part of an individual worker of the distributed computing system, and wherein the select set of rows is assigned by the distributed system to the individual worker.

In Example 9, the subject matter of Examples 7-8 includes, wherein bound information is shared across multiple workers of the plurality of workers operating on a same machine.

In Example 10, the subject matter of Examples 1-9 includes, wherein the operations comprise: determining whether the lower score bound and the upper score bound have been initialized; and initializing the lower score bound and the upper score bound based on respective default values.

In Example 11, the subject matter of Examples 1-10 includes, wherein the first artificial intelligence model comprises a first language model.

In Example 12, the subject matter of Examples 1-11 includes, wherein the second artificial intelligence model comprises a second language model.

In Example 13, the subject matter of Examples 1-12 includes, wherein the first artificial intelligence model comprises a non-foundation model, and wherein the second artificial intelligence model comprises a foundation model.

In Example 14, the subject matter of Examples 1-13 includes, wherein the first artificial intelligence model comprises a large language model that returns log probabilities for generated tokens, and wherein each first response confidence score of the set of first response confidence scores is determined based on one or more log probabilities provided by the large language model with a corresponding first response.

In Example 15, the subject matter of Examples 1-14 includes, wherein the first artificial intelligence model comprises an embedding model, and wherein each first response confidence score in the set of first response confidence scores is determined based on a vector similarity between embeddings generated by the first artificial intelligence model for the artificial intelligence model prompt and data in a corresponding row of the set of rows.

In Example 16, the subject matter of Examples 1-15 includes, wherein the first artificial intelligence model comprises a binary classifier trained using previous second responses generated from the second artificial intelligence model, and wherein each first response confidence score in the set of first response confidence scores represents a confidence value output by the binary classifier for a corresponding first response.

In Example 17, the subject matter of Examples 1-16 includes, wherein the sampling of the set of unprocessed rows from the set of rows comprises: determining a square root of the first response confidence scores for all unprocessed rows in the set of rows that have yet to be processed by the second artificial intelligence model and that have a corresponding first response confidence score between the lower score bound and the upper score bound; scaling the resulting values to sum to a value of one; determining a weighted average between the scaled values and a constant vector that sums to the value of one; and performing weighted sampling of the subset of unprocessed rows from the set of rows using the weighted average to determine which rows to include in the subset of unprocessed rows.

In Example 18, the subject matter of Examples 1-17 includes, wherein the operations comprise: monitoring for when a maximum budget of calls to the second artificial intelligence model has been reached; and based on determining that the maximum budget has been reached or exceeded: determining a midpoint value between the lower score bound and the upper score bound; and for a subset of the set of sampled rows that remain to be processed by the second artificial intelligence model: assigning a negative response to each row in the subset of sampled rows that have a corresponding first response confidence score below the midpoint value; and assigning a positive response to each row in the subset of sampled rows having a corresponding first response confidence score above the midpoint value.

Example 19 is a method to implement any of Examples 1-18.

Example 20 is a machine-storage medium storing instructions that when executed by a machine, cause the machine to perform operations to implement any of Examples 1-18.

Although the example embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other example embodiments may be used and derived therefrom, such that structural and logical substitutions and changes may be made without departing from the scope of this disclosure. This Detailed Description, therefore, is not to be taken in a limiting sense, and the scope of various example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various example embodiments. Combinations of the above embodiments, and other example embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one processor; and
at least one memory storing instructions that cause the at least one processor to perform operations comprising:
    generating, for a set of rows, a set of first responses and a set of first response confidence scores by processing each row of the set of rows using a first artificial intelligence model based on an artificial intelligence model prompt;
    while there is at least one unprocessed row of the set of rows having a corresponding first response confidence score between a lower score bound and an upper score bound, iteratively performing sub-operations comprising:
        generating a set of sampled rows by sampling, from the set of rows, a set of unprocessed rows that have yet to be processed by a second artificial intelligence model and that have corresponding first response confidence scores between the lower score bound and the upper score bound;
        generating a set of second responses that correspond to the set of sampled rows by processing each row of the set of sampled rows using the second artificial intelligence model based on the artificial intelligence model prompt, the set of second responses and a subset of the set of first response confidence scores that correspond to the set of sampled rows being added to cumulative data, the cumulative data being retained across iterations of the sub-operations, the processing of each row of the set of sampled rows using the second artificial intelligence model being more computationally expensive than processing each row of the set of sampled rows using the first artificial intelligence model; and
        updating at least one of the lower score bound and the upper score bound based on at least a portion of the cumulative data; and
    generating a set of final responses corresponding to the set of rows based on at least one of:

one or more second responses from the cumulative data; or one or more first responses from the set of first responses and one or more corresponding first response confidence scores from the set of first response confidence scores.

2. The system of claim 1, wherein the operations comprise:

determining whether there are any unprocessed rows of the set of rows that have yet to be processed by the second artificial intelligence model and that have a corresponding first response confidence score between the lower score bound and the upper score bound.

3. The system of claim 1, wherein the artificial intelligence model prompt comprises an instruction for classifying data.

4. The system of claim 1, wherein the generating of the set of final responses corresponding to the set of rows comprises:

for each row of the set of rows that was sampled and processed by the second artificial intelligence model, using a corresponding second response from the cumulative data as the final response for that row;

for each row of the set of rows that remains unprocessed by the second artificial intelligence model and that has a corresponding first response confidence score below the lower score bound, generating a negative response as the final response for that row; and for each row of the set of rows that remains unprocessed by the second artificial intelligence model and that has a corresponding first response confidence score above the upper score bound, generating a positive response as the final response for that row.

5. The system of claim 4, wherein the artificial intelligence model prompt comprises an instruction for classifying data, wherein the negative response comprises a negative classification response, and wherein the positive response comprises a positive classification response.

6. The system of claim 1, wherein the operations comprise:

receiving a structured language data query for a data store, the structured language data query comprising a filter operator and a filter operator parameter, the filter operator parameter comprising the artificial intelligence model prompt that serves as a filter criterion for the filter operator; and determining, based on the structured language data query, the set of rows from the data store to be filtered by the filter operator.

7. The system of claim 1, wherein the set of rows is a select set of rows, and wherein the operations comprise:

receiving a structured language data query for a data store, the structured language data query comprising a filter operator and a filter operator parameter, the filter operator parameter comprising the artificial intelligence model prompt that serves as a filter criterion for the filter operator;

determining, based on the structured language data query, a plurality of rows from the data store to be filtered by the filter operator; and partitioning the plurality of rows into two or more sets of rows that include the select set of rows.

8. The system of claim 7, wherein the system is a distributed system, wherein the distributed system comprises a plurality of workers operating in parallel on different portions of the plurality of rows, wherein the at least one processor is part of an individual worker of the distributed system, and wherein the select set of rows is assigned by the distributed system to the individual worker.

9. The system of claim 8, wherein bound information is shared across multiple workers of the plurality of workers operating on a same machine.

10. The system of claim 1, wherein the operations comprise:

determining whether the lower score bound and the upper score bound have been initialized; and initializing the lower score bound and the upper score bound based on respective default values.

11. The system of claim 1, wherein the first artificial intelligence model comprises a first language model.

12. The system of claim 1, wherein the second artificial intelligence model comprises a second language model.

13. The system of claim 1, wherein the first artificial intelligence model comprises a non-foundation model, and wherein the second artificial intelligence model comprises a foundation model.

14. The system of claim 1, wherein the first artificial intelligence model comprises a large language model that returns log probabilities for generated tokens, and wherein each first response confidence score of the set of first response confidence scores is determined based on one or more log probabilities provided by the large language model with a corresponding first response.

15. The system of claim 1, wherein the first artificial intelligence model comprises an embedding model, and wherein each first response confidence score in the set of first response confidence scores is determined based on a vector similarity between embeddings generated by the first artificial intelligence model for the artificial intelligence model prompt and data in a corresponding row of the set of rows.

16. The system of claim 1, wherein the first artificial intelligence model comprises a binary classifier trained using previous second responses generated from the second artificial intelligence model, and wherein each first response confidence score in the set of first response confidence scores represents a confidence value output by the binary classifier for a corresponding first response.

17. The system of claim 1, wherein the sampling of the set of unprocessed rows from the set of rows comprises:

determining a square root of the first response confidence scores for all unprocessed rows in the set of rows that have yet to be processed by the second artificial intelligence model and that have a corresponding first response confidence score between the lower score bound and the upper score bound;

scaling resulting values to sum to a value of one;

determining a weighted average between the scaled values and a constant vector that sums to the value of one; and performing weighted sampling of the subset of unprocessed rows from the set of rows using the weighted average to determine which rows to include in the subset of unprocessed rows.

18. The system of claim 1, wherein the operations comprise:

monitoring for when a maximum budget of calls to the second artificial intelligence model has been reached; and based on determining that the maximum budget has been reached or exceeded:

determining a midpoint value between the lower score bound and the upper score bound; and for a subset of the set of sampled rows that remain to be processed by the second artificial intelligence model:

assigning a negative response to each row in the subset of sampled rows that have a corresponding first response confidence score below the midpoint value; and assigning a positive response to each row in the subset of sampled rows having a corresponding first response confidence score above the midpoint value.

19. A method comprising:

generating for a set of rows, by at least one processor, a set of first responses and a set of first response confidence scores by processing each row of the set of rows using a first artificial intelligence model based on an artificial intelligence model prompt;

while there is at least one unprocessed row of the set of rows having a corresponding first response confidence score between a lower score bound and an upper score bound, iteratively performing sub-operations comprising:

determining, by the at least one processor, a set of sampled rows by sampling, from the set of rows, a set of unprocessed rows that have yet to be processed by a second artificial intelligence model and that have corresponding first response confidence scores between the lower score bound and the upper score bound;

generating, by the at least one processor, a set of second responses that correspond to the set of sampled rows by processing each row of the set of sampled rows using the second artificial intelligence model based on the artificial intelligence model prompt, the set of second responses and a subset of the set of first response confidence scores that correspond to the set of sampled rows being added to cumulative data, the cumulative data being retained across iterations of the sub-operations, the processing of each row of the set of sampled rows using the second artificial intelligence model being more computationally expensive than processing each row of the set of sampled rows using the first artificial intelligence model; and updating, by the at least one processor, at least one of the lower score bound and the upper score bound based on at least a portion of the cumulative data; and generating a set of final responses corresponding to the set of rows based on at least one of:

one or more second responses from the cumulative data; or one or more first responses from the set of first responses and one or more corresponding first response confidence scores from the set of first response confidence scores.

20. The method of claim 19, comprising:

determining, by the at least one processor, whether there are any unprocessed rows of the set of rows that have yet to be processed by the second artificial intelligence model and that have a corresponding first response confidence score between the lower score bound and the upper score bound.

21. The method of claim 19, wherein the artificial intelligence model prompt comprises an instruction for classifying data.

22. The method of claim 19, wherein the generating of the set of final responses corresponding to the set of rows comprises:

for each row of the set of rows that was sampled and processed by the second artificial intelligence model, using a corresponding second response from the cumulative data as the final response for that row;

for each row of the set of rows that remains unprocessed by the second artificial intelligence model and that has a corresponding first response confidence score below the lower score bound, generating a negative response as the final response for that row; and for each row of the set of rows that remains unprocessed by the second artificial intelligence model and that has a corresponding first response confidence score above the upper score bound, generating a positive response as the final response for that row.

23. The method of claim 22, wherein the artificial intelligence model prompt comprises an instruction for classifying data, wherein the negative response comprises a negative classification response, and wherein the positive response comprises a positive classification response.

24. The method of claim 19, comprising:

receiving by the at least one processor, a structured language data query for a data store, the structured language data query comprising a filter operator and a filter operator parameter, the filter operator parameter comprising the artificial intelligence model prompt that serves as a filter criterion for the filter operator; and determining, by the at least one processor and based on the structured language data query, the set of rows from the data store to be filtered by the filter operator.

25. The method of claim 19, wherein the set of rows is a select set of rows, and wherein the method comprises:

receiving, by the at least one processor, a structured language data query for a data store, the structured language data query comprising a filter operator and a filter operator parameter, the filter operator parameter comprising the artificial intelligence model prompt that serves as a filter criterion for the filter operator;

determining, by the at least one processor and based on the structured language data query, a plurality of rows from the data store to be filtered by the filter operator; and partitioning, by the at least one processor, the plurality of rows into two or more sets of rows that include the select set of rows.

26. The method of claim 19, comprising:

determining, by the at least one processor, whether the lower score bound and the upper score bound have been initialized; and initializing, by the at least one processor, the lower score bound and the upper score bound based on respective default values.

27. The method of claim 19, wherein the first artificial intelligence model comprises a first language model.

28. The method of claim 19, wherein the second artificial intelligence model comprises a second language model.

29. The method of claim 19, wherein the first artificial intelligence model comprises a non-foundation model, and wherein the second artificial intelligence model comprises a foundation model.

30. A machine-storage medium storing instructions that when executed by a machine, cause the machine to perform operations comprising:

generating, for a set of rows, a set of first responses and a set of first response confidence scores by processing each row of the set of rows using a first artificial intelligence model based on an artificial intelligence model prompt;

while there is at least one unprocessed row of the set of rows having a corresponding first response confidence score between a lower score bound and an upper score bound, iteratively performing sub-operations comprising:

determining a set of sampled rows by sampling, from the set of rows, a set of unprocessed rows that have yet to be processed by a second artificial intelligence model and that have corresponding first response confidence scores between the lower score bound and the upper score bound;

generating a set of second responses that correspond to the set of sampled rows by processing each row of the set of sampled rows using the second artificial intelligence model based on the artificial intelligence model prompt, the set of second responses and a subset of the set of first response confidence scores that correspond to the set of sampled rows being added to cumulative data, the cumulative data being retained across iterations of the sub-operations, the processing of each row of the set of sampled rows using the second artificial intelligence model being more computationally expensive than processing each row of the set of sampled rows using the first artificial intelligence model; and updating at least one of the lower score bound and the upper score bound based on at least a portion of the cumulative data; and generating a set of final responses corresponding to the set of rows based on at least one of:

one or more second responses from the cumulative data; or one or more first responses from the set of first responses and one or more corresponding first response confidence scores from the set of first response confidence scores.

\* \* \* \* \*